(12) United States Patent  
Lee

(10) Patent No.: US 8,548,440 B2  
(45) Date of Patent: Oct. 1, 2013

(54) EVENT INFORMATION DISPLAY APPARATUS AND METHOD FOR MOBILE COMMUNICATION TERMINAL

(75) Inventor: Eun-Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1516 days.

(21) Appl. No.: 11/864,587

(22) Filed: Sep. 28, 2007

(65) Prior Publication Data

US 2008/0081594 A1   Apr. 3, 2008

(30) Foreign Application Priority Data

Sep. 29, 2006  (KR) .................. 10-2006-0096383

(51) Int. Cl.
*H04M 3/00*  (2006.01)

(52) U.S. Cl.
USPC ................................................. 455/414.1

(58) Field of Classification Search
USPC .............. 455/414.1, 413, 415, 419, 412.1, 455/456.1, 412.2, 407, 403, 411; 715/848, 715/764, 703, 771; 705/808
See application file for complete search history.

(56) References Cited

U.S. PATENT DOCUMENTS

| | | | |
|---|---|---|---|
| 2004/0078693 A1* | 4/2004 | Kellett | 714/38 |
| 2005/0032527 A1* | 2/2005 | Sheha et al. | 455/456.1 |
| 2005/0060667 A1* | 3/2005 | Robbins | 715/848 |
| 2005/0075097 A1* | 4/2005 | Lehikoinen et al. | 455/414.1 |
| 2006/0090141 A1* | 4/2006 | Loui et al. | 715/764 |

FOREIGN PATENT DOCUMENTS

JP   11-085450   3/1999

* cited by examiner

*Primary Examiner* — Kiet Doan  
(74) *Attorney, Agent, or Firm* — Lee, Hong, Degerman, Kang & Waimey

(57) ABSTRACT

Disclosed is an event information display apparatus and method for a mobile terminal, which collects information of sent/received/missed call events, sent/received message events, schedule events, alarm events, wake-up call events, memo events, D-day events, etc. that are recorded in a mobile terminal, and then displays the collected event information as indicators on a timeline, thereby enabling easy checking and management of various types of events.

18 Claims, 7 Drawing Sheets

EVENT INFORMATION DISPLAY APPARATUS AND METHOD FOR MOBILE COMMUNICATION TERMINAL

This application claims the priority benefit of the Korean Application No. 10-2006-0096383, filed on Sep. 29, 2006, which is hereby incorporated by reference as if fully set forth herein.

BACKGROUND OF THE INVENTION

1. Field of the Invention

The present invention relates to a mobile terminal (e.g., a mobile telecommunication terminal, mobile broadcast receiver, PDA, etc.), and more particularly, to an event information display apparatus and method for a mobile terminal.

2. Description of the Background Art

Related art mobile terminals record events such as sent, received and missed calls into a call list, and record events such as sent and received messages into a message storage file. In addition, the related art mobile terminals record schedule events in a scheduler, and record events such as an alarm and a wake-up call in a menu storage file.

However, since the related art mobile terminals manage each of such various events by different functional parts or under different user menus in a separate manner, information about each item of such events needs to be separately dealt with by the user of the mobile terminal in order to check, modify and set the events, which requirement presents difficulty for the user desiring to conveniently check and manage information about various events.

SUMMARY OF THE INVENTION

Therefore, it is an object of the present invention to provide an event information display apparatus and method for a mobile terminal which collects information of various events, displays the collected event information on a timeline as predetermined indicators and, if there are a plurality of events occurring within adjacent time slots, displays a separate indicator representing an event group on the timeline, thereby enabling a user to easily check and manage information about the events.

It is another object of the present invention to provide an event information display apparatus and method for a mobile terminal which enables a user to easily check and manage information of past, present and future events by collecting information of various events, and displaying the collected event information on past, present and future timelines.

To achieve these and other advantages and in accordance with the purposes of the present invention, as embodied and broadly described herein, there is provided an event information display apparatus for a mobile terminal, including: a control unit that performs control such that, upon detecting events, such detected events are shown as indicators on a timeline that expresses time transitions in terms of a linear track, and a display unit on which may be displayed the timeline and the indicators under the control of the control unit.

There is further provided an event information display method for a mobile terminal, including steps of: detecting information of an event, and displaying the detected event information as an indicator on a timeline that expresses time transitions in terms of a linear track.

Preferably, the event can be one or more events selected from calls sent, received and missed, messages sent and received, schedules, an alarm, wake-up calls, memos and D-day.

Preferably there is further provided a step of displaying information of an event group representing events the occurrence of which are detected in more than a predetermined frequency as an indicator, after determining the time and frequency at which the detected event has occurred and if events occur more than the predetermined frequency within the predetermined time.

Preferably, the indicator for representing the event group information represents as one icon the information of events detected as occurring in more than the predetermined frequency.

Preferably, the process of displaying the detected event information as indicators further includes the steps of, as time elapses, updating and displaying the timeline and event information.

Preferably, the indicator for representing the event group is differently displayed in size according to the number of the detected events.

Preferably, the process of displaying event information as indicators on the timeline displays the event information by updating the timeline as time elapses.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the preferred embodiments of an event information display apparatus and method for a mobile terminal, which enables a user to easily check and manage information of various events by collecting information of the various events, displaying the collected information of the events as indicators on a timeline, and displaying information of events which are detected as occurring with more than a predetermined frequency within a predetermined time among the collected event information as a separate indicator on the timeline, with reference to FIGS. 1 through 7.

Figure 1:
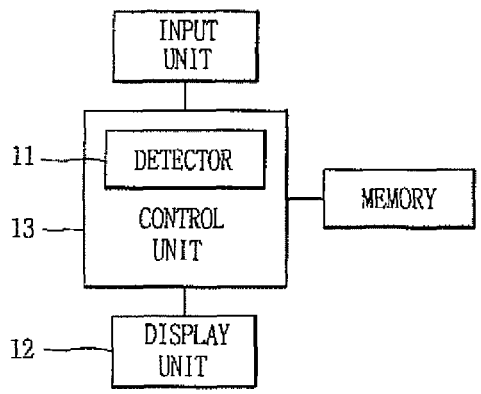
FIG. 1 is a block diagram showing a configuration of an event information display apparatus for a mobile terminal according to one embodiment of the present invention.

FIG. 1 is a schematic block diagram showing the construction of an event information display apparatus for a mobile terminal according to one embodiment of the present invention.

As shown in FIG. 1, the event information display apparatus for a mobile terminal according to the present invention includes a control unit 13 that performs control operations such that, upon detecting information of events, such detected event information is caused to be displayed as indicators on a timeline that expresses time transitions in terms of a linear track, and a display unit 12 for displaying the timeline and the indicators under the control of the control unit 13. Herein, when it is described that a function is performed by the control unit 13, it will be understood by those skilled in the art that such functionality is accomplished by the execution of control routines of a control program running in the control unit 13 and receiving, operating upon and output data and commands from and to the other elements of the mobile terminal operably connected and communicating therewith. A detector unit 11 for detecting information of events may be included or implemented in the control unit 13.

The term "event" as used herein refers to an event occurring in connection with or in respect of which a record is kept in a mobile terminal, such as a portable phone, personal digital assistant (PDA), etc., and signifies operations performed for informing a user of the mobile terminal about calls sent, received and missed, about messages sent and received, about a schedule/alarm/wake-up call, and the like. Hereinafter, for convenience, the terms "event" and "events" will be used for referring also to the underlying information concerning such events.

The timeline displayed on the display unit 12 by the control unit 13 may have a circular shape, an oval shape, a polygonal shape including a rectangular shape, etc. The timeline may include an AM timeline for representing the forenoon, and a PM timeline for representing the afternoon. Numerical figures for representing time may also be displayed on the timeline.

After events (i.e., information of events, hereinafter, simply referred to as "events") are collected by the detector 11, the control unit 13 causes the collected events to be displayed on the display unit 12 on the AM or PM timeline as indicators. Preferably, when displaying the indicators on the timeline, the indicators are shown in correspondence with time slots displayed on the timeline, based on the time of occurrence or setting for each of the events.

Meanwhile, as time elapses, the control unit 13 updates the timeline displayed on the display unit 12. For instance, if the time is changed from AM to PM, the control unit 13 displays the PM timeline representing the afternoon on the display unit 12, instead of the AM timeline representing the forenoon. In addition, the control unit 13 may be configured to update the timeline every time a predetermined time has passed or when a new event has occurred.

Next, the operation of the event information display apparatus for a mobile terminal according to the present invention will be explained in detail with reference to FIG. 2.

Figure 2:
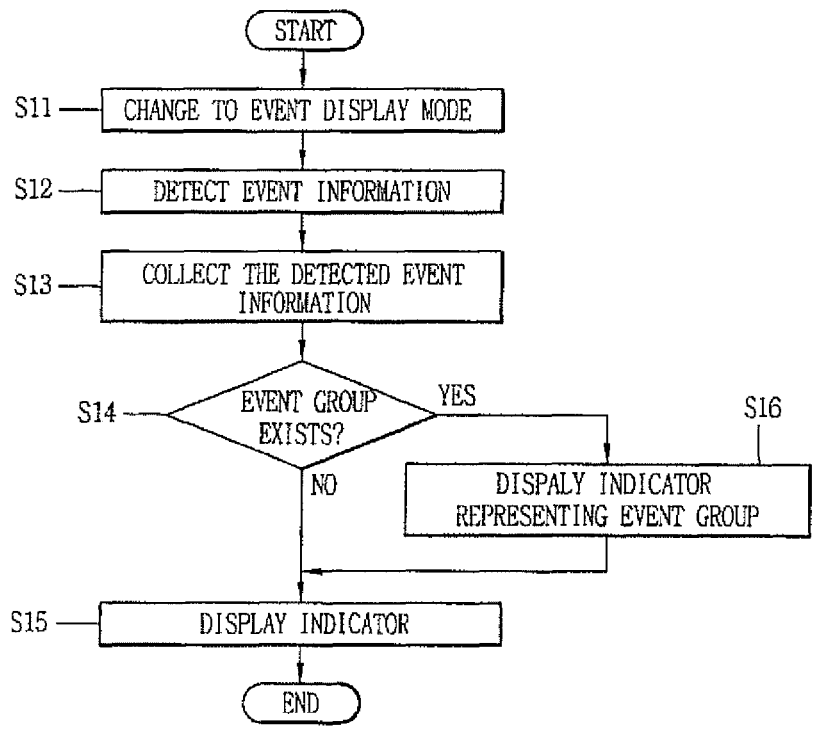
FIG. 2 is a flowchart illustrating steps of an event information display method for a mobile terminal according to one embodiment of the present invention.

FIG. 2 is a flowchart illustrating the steps of an event information display method as implemented in the above-described mobile terminal according to one embodiment of the present invention.

First, when an operation mode of the mobile terminal is changed into an event display mode at step S11, the detector 11 at step S12 detects the various types of events generated by and recorded in the mobile terminal, and then at step S13 collects the detected events. For instance, the detector 11 detects the various events, such as calls sent, received and missed, messages sent and received, schedule information, alarms, a wake-up call, task events, D-day events, reservation message events, etc., and then collects the detected events, and finally outputs the collected events to the control unit 13.

The control unit 13 detects any event groups among the collected events at step S14.

An event group refers to those events which are detected as occurring with more than a predetermined frequency within a predetermined time. When a plurality of events occur in a short time, and if each of the events is to be shown on the timeline based on their occurrence time, in accordance with an earlier display method individual indicators representing each event are overlaid with each other. Accordingly, it would be difficult for a user to easily recognize each of the individual indicators. In order to solve this problem, when a plurality of events occur at adjacent time slots, it is preferable to use separate indicators to display the plurality of events. For such need, an indicator representing an event group is used.

As a result of collecting the detected events, when a plurality of events occur in a short time, an indicator representing an event group is used to display the plurality of events on the display unit 12 at step S16. Events which do not belong to the event group are each displayed individually on the display unit 12 by an indicator having a predetermined shape at step S15.

Figure 3A:
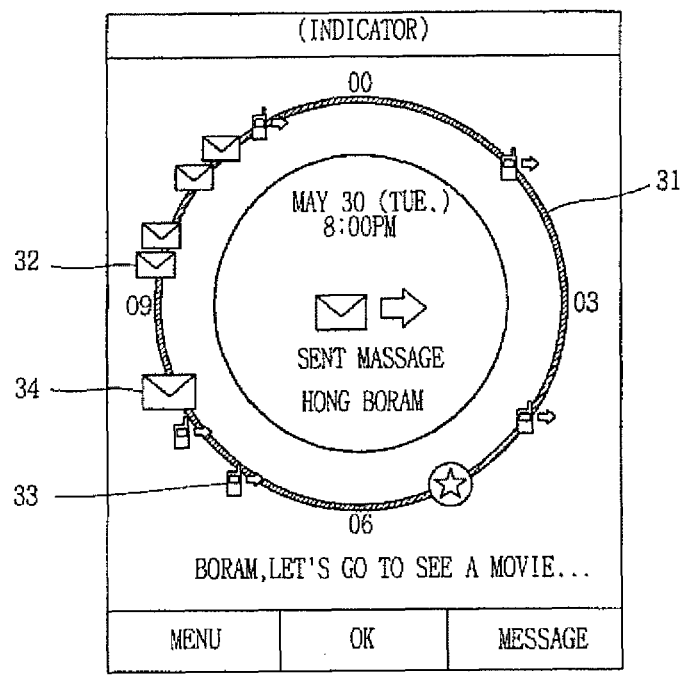
FIG. 3A is a depiction of a display screen of a mobile terminal showing information of events displayed as indicators according to one embodiment of the present invention.

FIG. 3A is a screen display of a mobile terminal showing events displayed as indicators according to one embodiment of the present invention.

Referring to FIG. 3A, the timeline 31 is displayed in a circular shape in the familiar manner of the face of a clock, showing a timeline from noon to midnight. The forms of the indicators may include numerals, characters, diagrams, pictures, moving images, emoticons, icons, and the like. In FIG. 3A, the indicators are displayed iconically on the timeline 31, for instance, an event indicator 32 representing an event for sending/receiving of a short message service (SMS) text message, an event indicator 33 for an outgoing call, and the like.

In particular, when events are detected in more than a certain number in a short time, such events are displayed by being integrated into an indicator 35 representing an event group.

For instance, if a scheduled event was set for 5 pm by the user, an incoming call was received at 5:02 PM and a text message was received at 5:03 PM, then if each of the schedule event indicator, the incoming call reception event indicator and the text message event indicator is displayed on the timeline 31, such would cause the indicators to be overlapped with or superimposed upon each other. Accordingly, the indicator 35 representing the event group can be used to display those events as one indicator. When displaying the indicator 35 representing the event group, the size of the indicator can be set differently, depending on the number of the events represented by the indicator 35 representing the event group. For instance, the more the events included, the larger the displayed size of the indicator 35 representing the event group.

When the user communicates with another party through text messaging, a plurality of text messages may typically be exchanged within a short time. In this case, as shown in FIG. 3A, the occurrence of the plurality of events caused by the exchange of text messages can be shown as one indicator 34, and the number of sent/received messages can also be displayed on the single text message indicator 34. The indicator 34 with the number "5" contained therein indicates that 5 text messages were sent and received within a predetermined time period. In FIG. 3A, the indicator 34 displayed with the number is configured to have a larger size, compared to the indicator 32 representing another text message event. With such configuration, the user may easily recognize the time slot in which the plurality of text messages have been exchanged and the number of the text messages sent and received.

Figure 3B:
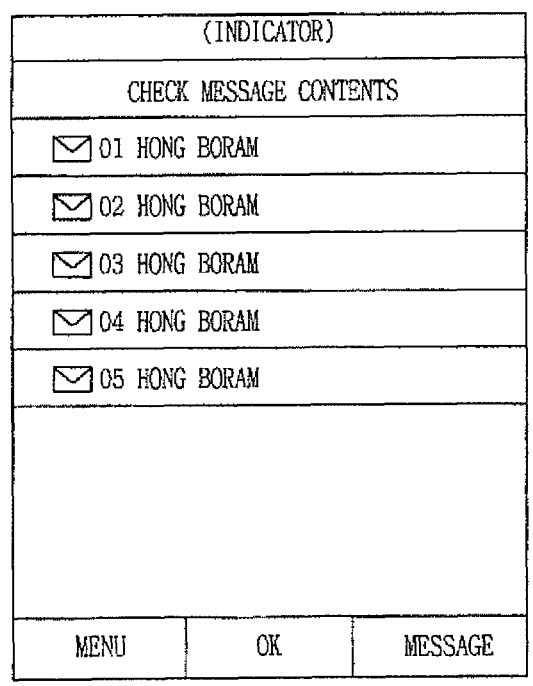
FIG. 3B is a depiction of a display screen of a mobile terminal showing an exemplary screen displayed when an indicator representing an event group is selected.

As shown in FIG. 3B, if the user selects the indicator 34 on the screen of FIG. 3A displayed with the number therein so as to check the contents of the messages included in exchange event represented by the indicator 34 displayed with the number, the individual message contents included therein are displayed on the display screen. FIG. 3B shows an example where 5 text messages have been sent to the same person (e.g., 'Hong Bo Ram' in FIG. 3B) in adjacent time slots.

Further, if the user selects a specific indicator located on the timeline, the control unit 13 executes a program corresponding to the selected indicator. The functionality necessary for executing a program corresponding to a specific indicator, and the implementation of a process for executing a program associated with the specific indicator are within the capability of a person of ordinary skill in the art, and thus detailed explanations therefor are omitted.

Figure 4A:
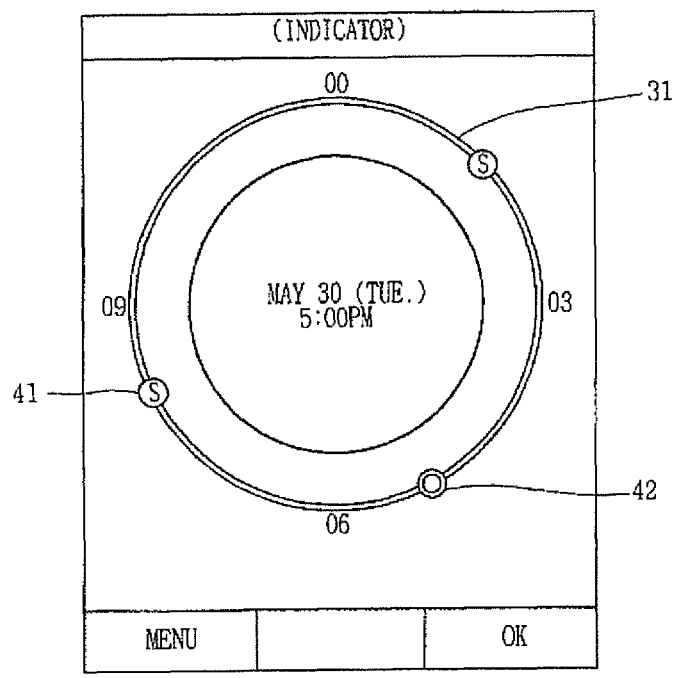
FIGS. 4A through 4C are respective depictions of a display screen of a mobile terminal illustrating one embodiment of setting/registering events at a particular time.
Figure 4B:
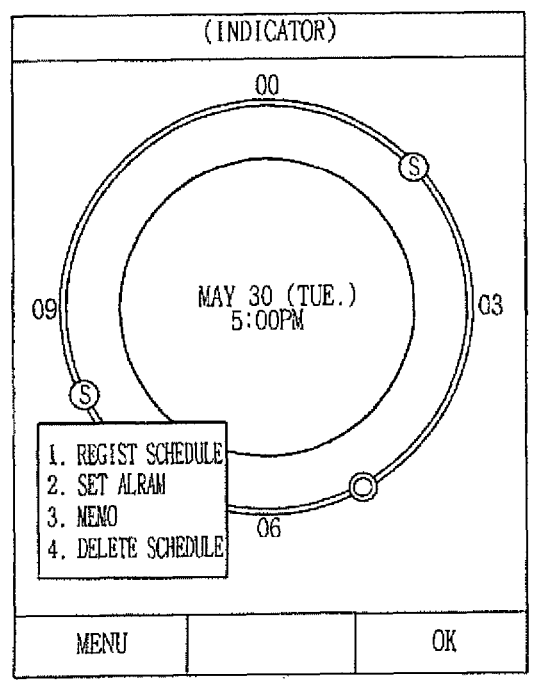
Figure 4C:
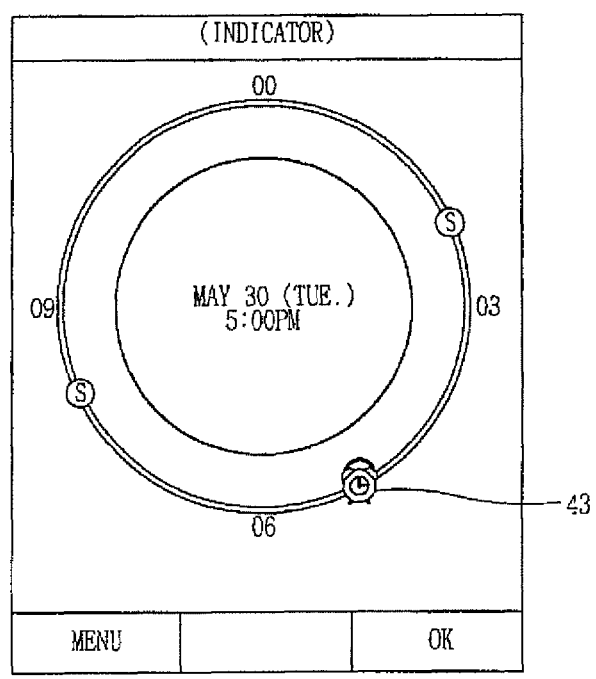

FIGS. 4A through 4C illustrate respect screen displays of a mobile terminal showing one embodiment of setting/registering an event at a particular time.

When a user selects a particular time on the timeline, the control unit 13 provides a function to set/register an event required by the user at the particular time. As shown in FIG. 4A, a pointer 42 for setting/registering an event is displayed on the timeline 31. An indicator 41 for a scheduled event which has already been registered is separately displayed. If the user moves the pointer 42 to a certain location along the timeline 31, time-related information corresponding to the location is displayed on a central portion of the display unit 12. If the user locates the pointer 42 on a time slot where an event is to be set and then selects or actuates a 'menu' button or key, event setting menu items are displayed as shown in FIG. 4B. If the user selects the menu item '2. set an alarm', an alarm clock indicator 43 is then displayed as shown in FIG. 4C. Accordingly, when setting an alarm, the user can easily set and register the alarm event by selecting a particular time on the timeline 31 without performing an additional time setting or time entry operation manually.

Further, the control unit 13 may provide separate menu selection items such that the user may select a particular indicator displayed on the timeline 31, and execute and/or change an event associated with the selected particular indicator. The control unit 13 may display detailed information related to the selected particular event on the display unit 12.

Figure 5:
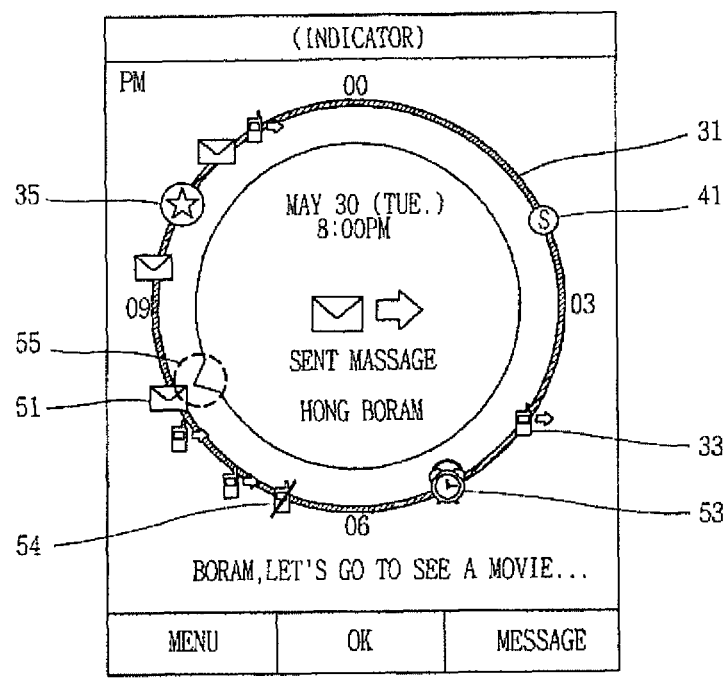
FIG. 5 is a depiction of a display screen of a mobile terminal illustrating one embodiment of displaying information of various events on a circular timeline.

FIG. 5 is an illustration of a screen display showing one example of displaying various events on a circularly-shaped timeline.

As shown in FIG. 5, the control unit 13 displays the circularly-shaped timeline 31 on the display unit 12. In addition, the control unit 13 displays an indicator 33 notifying an outgoing call event, an indicator 54 notifying a missed call event, an indicator 51 notifying a sent/received message event, an indicator 41 notifying a scheduled event, an indicator 53 notifying an alarm event, an indicator notifying an event such as a wake-up call/task/D-day, etc., an indicator notifying a reservation message event, an indicator 35 notifying a group of events occurring with more than a predetermined frequency within a predetermined time, etc. on the circularly-shaped timeline 31, based on the events detected by the detector 11. The circularly-shaped timeline may display time slots in various forms, such as the time slot representing either the forenoon or the afternoon, or the time slot representing one day with the hours numbered from 0 to 24, or the like.

The timeline 31 as shown in FIG. 5 displays the afternoon (post meridian) time slot from noon to midnight of the day in a clockwise direction, additionally displaying the letters 'PM' at the upper left corner of the display screen. As shown in FIG. 5, if a user places the cursor or pointer 55 on or adjacent an indicator such as the text message indicator 51, summary information related to the type of event, is date and time that the event has occurred, and the like is displayed at the central portion of the timeline display 31. And, the specific information concerning the event, such as the contents of the text message, are briefly displayed below the timeline 31. In FIG. 5, the cursor 55 is formed in a circular shape having a pointer protrusion only at a part needing to be indicated. However, the shape of the cursor 55 may be variously modified according to the form of the timeline, manner of user input, etc.

In addition, when events, such as unidentified messages, missed calls, alarms, etc. exist, the control unit 13 controls the indicator 54 corresponding to the event (e.g., missed call) to flash (blink), thereby informing a user about the presence of the event (e.g., missed call). When the user places the cursor 54 adjacent to the flashing indicator, a pop-up window may appear or summary information related to the event may be displayed at the lower end of the timeline 31 such that the user may be provided with detailed information.

Further, if the user places the cursor 55 next to the text message indicator and clicks the menu button, the mobile terminal may be configured to provide additional menu selections including creating a reply message, blocking message reception, deleting a message, and the like. In addition, if the user places the cursor 55 next to a sent/received call indicator and clicks the menu button, the mobile terminal may be configured to provide additional menu selections including calling the corresponding number, storing the telephone number received, blocking reception from the corresponding telephone number, and the like.

Figure 6:
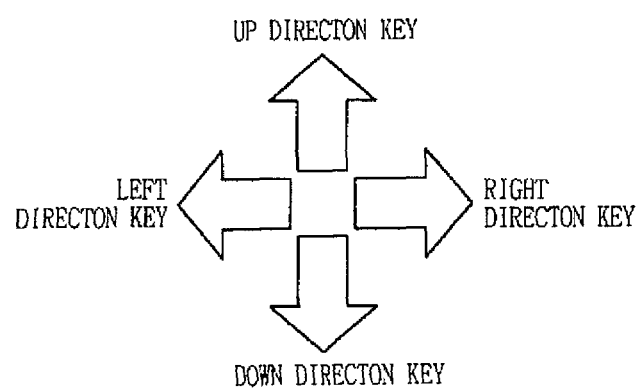
FIG. 6 is a diagram showing the movement directions of keys of a mobile terminal for searching information of events.

FIG. 6 is a diagram showing an example of the movement directions of user input keys of a mobile terminal for searching events.

A user may select one of the direction keys (right, left, up and down) disposed on a keypad of the mobile terminal to move to a past or future timeline, and thus the user may easily check memos, settings or schedules of the past or the future.

After selecting a timeline displayed on the display unit 12, the user may move to a specific time slot on the timeline by manipulating the direction keys disposed on the keypad. For instance, the user may move the cursor 55 along the circularly-shaped timeline to select a particular indicator, thereby easily checking and managing the corresponding event.

Referring to FIG. 6, the direction keys may include separate right, left, up and down directional arrow keys or may be implemented by a multi-directional key or joystick or touch-sensitive input pad or touchpad display screen equipping the mobile terminal. Here, each of the direction keys and the time slot representing a respective timeline can be intuitively matched for facile use in a manner that the left direction key is to select the AM time line, the right direction key is to select the PM time line, the up direction key is to select a future date, and the down direction key is to select a past date.

For instance, if today's date and time is Sep. 28, 2006 in the AM, and if the user desires to check on an event set for Sep. 30, 2006 in the PM, the user clicks the up direction key twice to move to the time slot of Sep. 30, 2006, and then clicks the right direction key once to select the PM timeline.

Preferably, the initial setting of the displayed timeline is set to the present time.

Further, if the user selects the AM or PM timeline, the left direction key is then configured to move towards the past time (counterclockwise direction), and the right direction key is then configured to move towards the future time (clockwise direction).

FIGS. 7A through 7D illustrate respective screen displays showing a process for checking an indicator representing an event group by using the event information display device of a mobile terminal according to the invention.

Figure 7A:
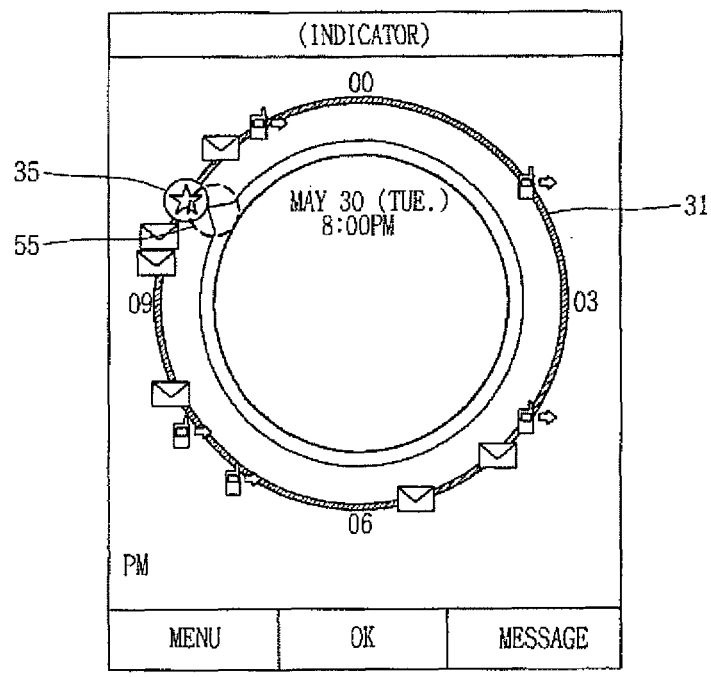
FIGS. 7A through 7D are respective depictions of a display screen of a mobile terminal illustrating an example of a process of checking indicators representing event groups by using an event information display of a mobile terminal.

Referring to FIG. 7A, to check the contents of an event among those events included in an indicator 35 representing an event group on the timeline 31 displayed on the display unit 12, the user moves the cursor 55 to the indicator 35 representing the event group.

Figure 7B:
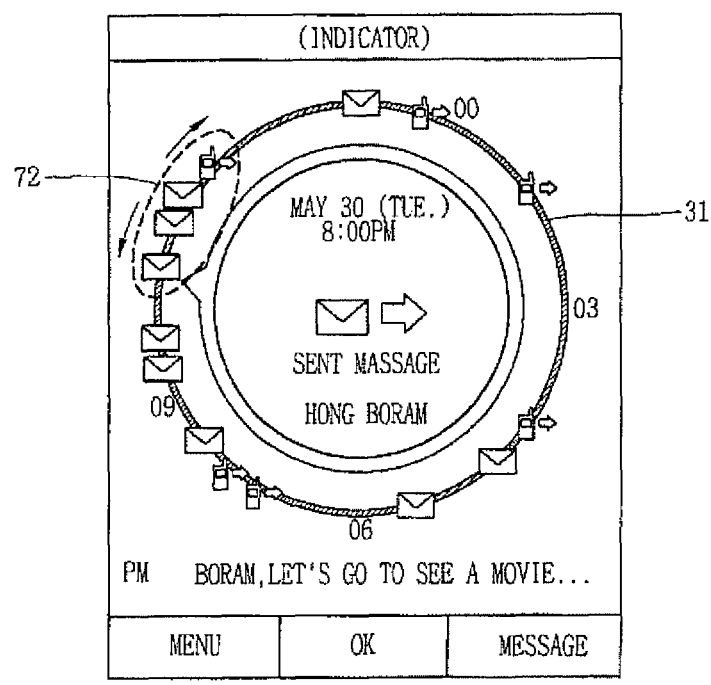

As shown in FIG. 7B, if the user selects the indicator 35 representing the event group, indicators 72 showing each of the individual events which are included in the event group indicator 35 representing the event group are outspread. Here, the control unit 13 expands the display of the portion of the timeline where the indicators are outspread, so as to prevent the overlapping of the outspread indicators 72 and to enable the user to easily distinguish each indicator. The arrows shown in FIG. 7B indicate that the timeline is expanded. As shown in FIG. 7B, while the timeline of the time slot from 9:00 PM to 11:59 PM is expanded, the displayed timelines of the time slots from 6 PM to 9 PM and from 12:01 PM to 3 PM are compressed.

Figure 7C:
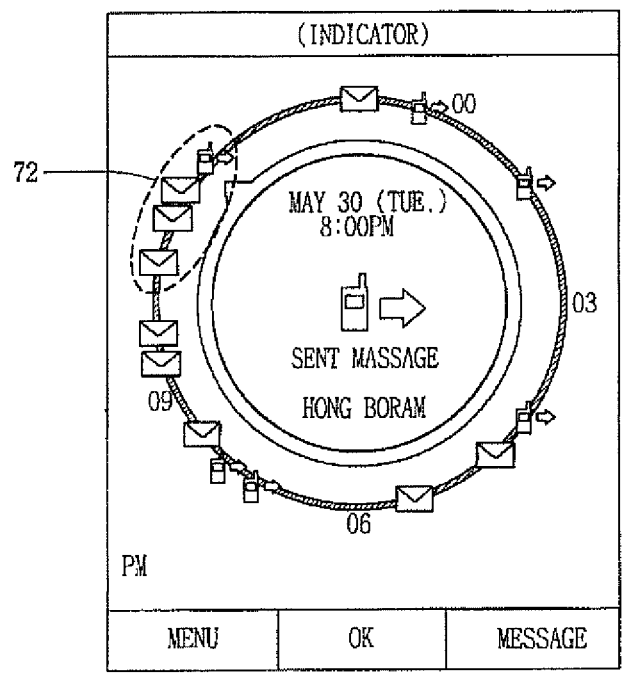

Referring to FIGS. 7B and 7C, the user may move the cursor 55 to easily check the contents of each of the outspread indicators 72. Information of an event related to the indicator on or adjacent to which the cursor 55 is located is displayed at the central portion of the display unit 12, and thus the user may easily recognize the information of each event.

Figure 7D:
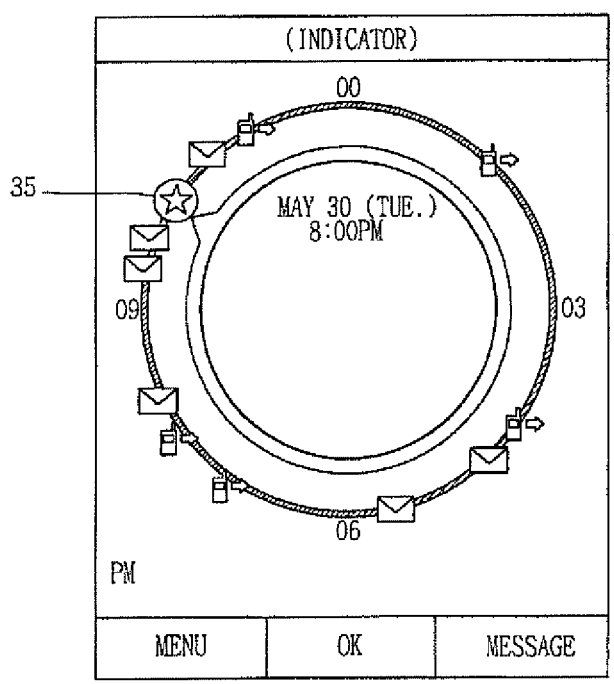

When the user has checked all desired contents of those events included among the events indicated by the indicator 35 representing the event group or desires to check the contents of another event indicator on the timeline 31, and if the cursor 55 is moved to the outside of the outspread indicators 72, as shown in FIG. 7D, the outspread indicators 72 revert to the initial form of the one event group indicator 35 and the expanded timeline is also returned to its original non-expanded state.

The foregoing embodiments and advantages are merely exemplary and are not to be construed as limiting the present invention. This description is intended to be illustrative, and not to limit the scope of the claims. Many alternatives, modifications, and variations will be apparent to those skilled in the art.

What is claimed is:

1. A method of a mobile terminal for displaying a history of messages and calls, the method comprising:
    displaying on a display unit of the mobile terminal a plurality of messages and calls associated with a same phone number that have occurred consecutively as an indicator of a group event;
    spreading the plurality of messages and calls as individual events in response to a selection of the indicator of the group event, wherein each of the individual events is tagged with an indicator configured to notify an event type of the each of the individual event; and
    generating on the display unit a detail of one of the individual events when the one of the individual events is accessed, wherein the indicator of the group event is different from the indicator configured to notify the event type of the each of the individual event, and wherein the indicator of the group event comprises a number of the individual events present in the group event.

2. The method of claim 1, wherein the indicator of the group event comprises an icon.

3. The method of claim 1, wherein the plurality of messages and calls are designated as the group event when the plurality of messages and calls associated with the same phone number occur more than a predetermined frequency within a predetermined time.

4. The method of claim 1, wherein the spreading the plurality of calls and messages comprises chronologically displaying the plurality of calls and messages as the individual events.

5. The method of claim 1, wherein the generating step comprises displaying a menu associated with the same phone number.

6. The method of claim 5, wherein the menu comprises a message transmission, a disable of message reception, a reply, and a message deletion.

7. The method of claim 1, wherein the generating step comprises displaying call or message information associated with the one of the individual events.

8. The method of claim 1, wherein the indicator of the group event is displayed in a different size than the indicator configured to notify the event type of the each of the individual event.

9. The method of claim 1, wherein the indicator of the group event is displayed in a larger size when the number of the individual events present in the group event increases.

10. A mobile terminal comprising:
    a display unit; and
    a controller configured to:
    display on the display unit a plurality of messages and calls associated with a same phone number that have occurred consecutively as an indicator of a group event;
    spread the plurality of messages and calls as individual events in response to a selection of the indicator of the group event, wherein each of the individual events is tagged with an indicator configured to notify an event type of the each of the individual event; and
    generate a detail of one of the individual events when the one of the individual events is accessed, wherein the indicator of the group event is different from the indicator configured to notify the event type of the each of the individual event, and wherein the indicator of the group event comprises a number of the individual events present in the group event.

11. The mobile terminal of claim 10, wherein the indicator of the group event comprises an icon.

12. The mobile terminal of claim 10, wherein the plurality of messages and calls are designated as the group event when the plurality of messages and calls associated with the same phone number occur more than a predetermined frequency within a predetermined time.

13. The mobile terminal of claim 10, wherein the plurality of calls and messages are chronologically displayed as the individual events.

14. The mobile terminal of claim 10, wherein the controller is further configured to display a menu associated with the same phone number when the one of the individual events is accessed.

15. The mobile terminal of claim 14, wherein the menu comprises a message transmission, a disable of message reception, a reply, and a message deletion.

16. The mobile terminal of claim 10, wherein the controller is further configured to display call or message information associated with the one of the individual events.

17. The mobile terminal of claim 10, wherein the indicator of the group event is displayed in a different size than the indicator configured to notify the event type of the each of the individual event.

18. The mobile terminal of claim 10, wherein the indicator of the group event is displayed in a larger size when the number of the individual events present in the group event increases.

* * * * *